3,702,351
CATIONIC THERMOSETTING RESINS CONTAINING THE REACTION PRODUCT OF A CARBOXYL TERMINATED POLYESTER WITH AN EPOXY AMINE ADDUCT TREATED WITH EPICHLORHYDRIN
Gerard Tesson, Auzouer-en-Touraine, France, assignor to Manufacture de Produits Chimiques Protex, Levallois, Hauts-de-Seine, France
No Drawing. Filed June 9, 1970, Ser. No. 44,906
Int. Cl. C08g 45/14
U.S. Cl. 260—835                    7 Claims

ABSTRACT OF THE DISCLOSURE

A water-soluble cationic thermosetting resin is produced by reacting a polyester resin having terminal carboxyl groups with an epoxy-amine addition compound and condensing the product with epichlorhydrin. The wet strength of paper is improved by impregnating same with a solution of the resin and drying the paper.

---

The invention relates to the manufacture of certain novel water-soluble condensation products which are compatible with cellulose and intended more particularly for improving the wet strength of fibrous cellulosic materials such as paper, card, unwoven tissues and the like.

The invention embraces the novel condensation products, their manufacture and their various applications.

Water-soluble thermosetting resins have long been used for improving the wet strength of paper. This treatment can be carried out by impregnating or spraying the web of paper with a solution of the resin, but it is more usual to add the resin to the paper pulp before forming the web; it is obvious that in this latter case the resin must be made compatible with the cellulose because of the very low solids concentration encountered in the head box. The resulting web first passes through the wet end and then over the drying cylinders, where the heating effect cures the resin at the same time that the web is dried.

These aminoplastic resins all have the major disadvantage that they can only be cured under acid conditions, and these conditions give rise to grave problems of corrosion in the machines used.

On the other hand, there are certain polyamine-epichlorhydrin and polyamide-epichlorhydrin resins which are soluble in water, cationic and amenable to use in neutral or alkaline media, in general in the pH range 6–9. As a group, these resins are particularly adapted for improving the wet strength of paper; in particular, the group includes certain particularly well adapted resins having characteristics to be defined below.

Thus the invention is substantially characterized by a process for the manufacture of certain resin products, formed more particularly by reacting a polyester resin having a terminal carboxylic group with an epoxy-amine addition compound and then condensing the reaction product with epichlorhydrin.

The resin of the invention takes the form of an aqueous solution which is perfectly soluble in water, cationic and therefore compatible with cellulose fibers, and thermosetting; when incorporated in paper by any suitable means, but normally by addition to the aqueous stock before forming the web, it can be used in an acid, neutral or alkaline medium. Although the pH values which yield optimum strength values lie in the range of 5–10, it is a feature of the invention that a paper treated at a pH as low as 3 still possesses, after drying and curing the resin, a higher wet strength than can in general be obtained with cationic aminoplastic resins and what are known as "alkali treatment" resins (at the same content of dry resin substance). Whatever the pH at which the resin is used, paper treated therewith possesses excellent wet strength, pliability and improved capacity for absorption. This makes the resin particularly attractive for use in the manufacture of absorbent papers for personal use in such products as handkerchiefs, baby napkins, table napkins, serviettes, crepe paper towels and unwoven tissues, and also of such heavier products as wrapping papers, bags and even delicate articles such as filter papers, photographic papers and the like.

Although the principal object of the invention relates to the improvement in the wet strength of paper, the cationic and thermosetting nature of the product adapts it particularly to the role of a bonding agent for fibrous cellulosic or mineral felts. The resin of the invention is adapted in particular to the bonding of mineral fibers in materials such as glass, slag and asbestos, to form more or less dense felts, either alone or in conjunction with aminoplastic or phenolic thermosetting resins.

The resin of the invention is also useful for bonding together cellulosic or synthetic fibers in the manufacture of unwoven tissues, by spraying or dip impregnating the fibrous felt with an aqueous solution of the cationic resin, alone or in combination with a suitable binder such as a styrene-butadiene or acrylic resin emulsion. Another object of the invention is the high retentivity of the resin, which is very much sought after in papermaking when fillers or expensive pigments are to be added to the stock.

Moreover, the product of the invention has proved to be highly effective in the treatment of effluents as a primary coagulant or flocculation aid.

In the manufacture of these products, as stated earlier and now claimed as the substantial characteristic of the invention, a polyester resin (A) having a terminal carboxylic group is reacted with an epoxy-amine addition compound (B) and the resulting resinous product is then reacted with epichlorhydrin to obtain a water-soluble and cationic condensation product.

The polyesters (constituent A) used in making the resin of the invention are derived from the reaction of a saturated or unsaturated dicarboxylic aliphatic acid having 3–10 carbon atoms, for example succinic, adipic, azelaic or sebacic acid or the unsaturated maleic, itaconic or fumaric acids, with a straight- or branched-chain aliphatic glycol. The preferred glycols are those having two primary hydroxyl groups or one primary and one secondary hydroxyl groups; glycols having two secondary hydroxyl groups may be used, but in this case the esterification reaction is much more sluggish. Examples of glycols which can be used in the invention include ethylene glycol, diethylene glycol, triethylene glycol, propylene glycol, dipropylene glycol, hexylene glycol, 1,4-butane-diol, 1,5-pentane-diol, the propylene glycols, in particular those with a molecular weight below 600.

The esterification reaction is brought about by simply heating at least one glycol and at least one dicarboxylic acid under nitrogen at atmospheric pressure to a temperature at which the water of condensation can be distilled off, between 160 and 220° C. in general and 180 and 200° C. in particular. When reduced pressures are used, slightly lower reaction temperatures may be sufficient. The reaction time depends substantially on the temperatures and pressures used, but varies in general between one and a half and three hours, although these times may be extended or shortened according to the reaction conditions. It is in any case preferred to continue the reaction until the acid number approaches its theoretical limit, in order to secure the optimum results.

According to the features of the invention, it is essential for the polyester resin to have free carboxylic groups in the terminal position, in which case the molecular ratio of glycol to dicarboxylic acid should be in the range 0.5–1.5, preferably between 0.7 and 1.1. Below 0.5, the molecular weight of the polyester remains too low and the wet strength properties of paper treated with such a resin will be unsatisfactory.

When the molecular ratio exceeds 1.1, the carboxyl group content of the polyester is reduced and the wet strength of the treated paper is less satisfactory. A molecular ratio of about 0.9 between the glycol and the carboxylic acid is preferred, as the best compromise between the molecular weight and carboxyl group content aspects of the polyester resin.

Constituent B of the resinous product of the invention is an addition product formed by reacting a compound which contains a plurality of epoxy groups per molecule, preferably two, with a polyamine.

Of the epoxide derivatives adapted to the process, examples include the diglycidic esters of aliphatic polyalcohols such as ethylene glycol, diethylene glycol, propylene glycol, butylene glycol and glycerine, and the diglycidic esters of poly-hydroxyphenols or poly-phenols such as 1,4 - dihydroxyphenol, resorcinol, 4,4' - dihydroxydiphenylmethane and 4,4' - dihydroxydiphenylpropane. Of these diglycidic esters, the conventional epoxy resins made by reacting epichlorhydrin with 4,4'-dihydroxyphenylpropane are particularly adapted to the process of the invention, and more especially those resins which have an epoxy index of between 0.33 and 0.57.

The polyamines used in the process of the invention are the poly-alkylene polyamines having the formula

in which $x$ is at least 1 and R is an ethylene, propylene or butylene radical. These polyamines must contain at least 4 atoms of "reactive hydrogen" per molecule. The expression "reactive hydrogen atom" denotes a hydrogen atom bonded to the nitrogen of a primary or secondary amino group. Examples of the polyamines adapted to the process are the alkylene polyamines with two secondary amine groups such as ethylene diamine, and 1,3-propylene diamine, but it is preferred to use poly-alkylene polyamines with two primary and at least one secondary amine groups, such as diethylene triamine, triethylene tetramine, tetraethylene pentamine and the corresponding polypropylene and polybutylene polyamines. The epoxy compounds and polyamines selected for reaction may be taken singly or as mixtures thereof, provided that the proportions taken are such that there are 5–12 "reactive hydrogen atoms" for each epoxy group present, though the polyamine content can be increased to provide 15 or more "reactive hydrogen atoms."

Although this reaction can be effected by adding the polyamine to the epoxy compound, it is preferred to add the epoxy compound to the polyamine, because less care need be taken with the latter procedure and the risk of forming insoluble and infusible compounds is significantly reduced.

The reaction time varies with the addition rate, the reaction temperature and the refrigerating capacity of the reactor. The addition can be completed over a period of between 15 minutes and 3 hours; it is preferred to continue for a period of 30 minutes after adding the last of the reagents. The reaction can be carried out at temperatures between 30 and 120° C., preferably between 60 and 100° C., with or without the addition of a solvent; the use of a solvent may be worthwhile when the epoxy compound used is highly viscous, like certain resins based on bisphenol A and epichlorhydrin. The constituent (B) made in this way is a limpid liquid with little or no coloration, more or less viscous at room temperature, perfectly stable in storage and directly usable for the third stage of the process, which consists in the partial neutralization of the epoxy-amine addition compound (B) with the polyester containing free carboxylic groups.

The amount of polyester to be used in proportion to the epoxy-amine addition compound varies, particularly with the molecular weight of the polyester. They correspond in general to a free carboxylic group content in the polyester of between 0.05 and 0.2 per "reactive hydrogen atom." The number of carboxylic groups introduced by the polyester, within the limits indicated above, should be reduced as the molecular weight of the polyester is increased, otherwise the final condensation product with epichlorhydrin will not possess the required solubility in water.

This neutralization is effected at temperatures between 60 and 120° C., preferably between 80 and 100° C., by adding the polyester to the previously heated epoxy-amine addition compound. This reaction is very rapid, requiring from 30 minutes to 2 hours. The temperatures used to bring about this neutralization reaction betwen the polyester having free carboxylic groups and the epoxy-amine compound should not in any event exceed 130° C.; between 150 and 180° C. in particular, the product undergoes very rapid gelling.

In a final stage, a cationic thermosetting resin is obtained by reacting the product (C) prepared as described above with epichlorhydrin at a temperature between 45 and 100° C., preferably betwen 50 and 80° C., until the reaction product attains the desired viscosity. Since epichlorhydrin is bi-functional, the amount added should preferably suffice to convert all the primary or secondary amine groups into tertiary amine groups. For this reason, very good results are obtained by using 0.5 mol of epichlorhydrin per "reactive hydrogen atom." It is possible to use more epichlorhydrin than this, up to the point at which all the nitrogen atoms are converted to the quaternary state, but this extra epichlorhydrin is by no means necessary.

It is preferred to prepare the polymer by adding epichlorhydrin slowly to the agitated reaction product (C), preferably diluted with an equal weight of water.

The reaction is exothermic and it is therefore preferred to cool the mixture, at least while the epichlorhydrin is reacting vigorously. The reaction is continued until the mixture attains a viscosity exceeding 100 cp. measured at 20° C. in a Rotovisko-Haake viscometer (UM=1). Sufficient water is then added to lower the concentration to 25–30% of dry substance and the reaction is renewed until the viscosity at 20° C. again exceeds 100 cp. and is preferably in the range 300–500 cp. The product is diluted with more water to lower the concentration to 10–15% of dry substance. It is obviously possible to add the water in a single lot, sufficient to adjust the concentration to 25–30% of dry substance, and to hold the temperature until the desired viscosity is reached. The mixture is then neutralized if necessary to adjust its pH to about 5, using any suitable acid such as hydrochloric, sulphuric, nitric, formic, phosphoric or acetic, thereby stabilizing the product; the preferred acid is however hydrochloric.

Although the resin solution at 15% concentration has a shelf life exceeding 3 months, it is useful in certain cases to stabilize the resin still further by adding a quaternary amine-forming agent of any type, capable of converting the tertiary nitrogen atoms to the quaternary state in aqueous solution. Suitable examples include the methyl, ethyl or propyl esters of mineral acids such as hydrochloric, sulphuric or phosphoric, and the substituted alkyl halides.

The following example illustrates the process of preparing the cationic thermosetting resins and the applications of the invention, without limiting the scope thereof:

(a) Preparation of the polyester

Place 248 g. (4 moles) of ethylene glycol in a four-necked flask set up for distillation under atmospheric pressure with agitation.

Heat to 90–100° C. and slowly add 702 g. (4.8 moles) of adipic acid.

Continue heating under nitrogen until the mixture reaches a temperature of 200° C. Hold at 200° C. until the acid number is less than 150. The product is a colorless liquid resin which solidifies at 30–40° C.

(b) Preparation of the epoxy-amine addition compound

Place 420 g. (20 amino-hydrogen gram-atoms) of 98% pure diethylene triamine in a four-necked flask. Agitate and heat to 75° C. Over a period of 30 minutes, add 400 g. (2 epoxy gram-equivalents) of an epichlorhydrin-bisphenol A resin with an epoxy index of 0.49, cooling to prevent the temperature from rising beyond 90° C. Hold the reaction mixture at 80–90° C. for 30 minutes, then cool to 30° C.; at 20° C. the product has a viscosity of 27,400 cp. and a Gardner color of 3.

(c) Preparation of the cationic resin

Heat 121 g. (2.68 amino-hydrogen gram-atoms) of the above epoxy-amine addition compound to 90° C., with agitation, and over a period of 15 minutes add 129 g. (0.28 carboxyl gram-equivalents) of the above-mentioned polyester, previously melted at 80° C. Following the addition, hold the temperature at 90–100° C. for a further 30 minutes. Then add 250 g. of water, and at 60–70° C. slowly add 111 g. (1.2 moles) of epichlorhydrin, taking 30 minutes for the addition and cooling to hold the temperature at 60–70° C. Finally continue heating to maintain this temperature until the viscosity has risen to 400–600 cp., as measured on a Rotovisko-Haake viscometer (UM=1).

Add a further 480 g. of water and continue heating at 60–70° C. until the viscosity (at 20° C.) returns to 400–600 cp. At once add 925 g. of water. Cool the product to 25° C. This product is a liquid solution containing 14.8% of dry substance, with a Gardner color of 3, a viscosity of 43 cp. at 20° C. and a pH of 5.3. The shelf life of the resin exceeds 3 months.

Laboratory experiments were carried out by impregnating sheets of velin 65 g./m.² filter paper with a cold solution of the above resin, squeezing the paper so as to leave 0.7, 0.8, 1 or 1.5% of dry resin based on the dry weight of paper substance. The sheets were dried on a frame for 2 minutes at 150° C. and aged for 24 hours at 20° C. before cutting into 18 x 1 cm. strips. Tensile tests were carried out on the strip test pieces after saturating them with water by dipping and pressing. A Correx dynamometer was used to secure highly reproducible test results at breaking loads between 0 and 1000 g. The following table records the tensile strength of the wet paper at different pH values, expressed as grams per centimeter of strip width.

|  | Dry resin content, percent by dry weight of paper | pH 3 | pH 5 | pH 7 | pH 9 |
|---|---|---|---|---|---|
| Resin prepared as in Example 1 | 0.7 | 280 | 300 | 360 | 360 |
|  | 0.8 | 320 | 330 | 400 | 430 |
|  | 1 | 350 | 390 | 430 | 650 |
|  | 1.5 | 370 | 410 | 430 | 700 |
| Control | 0 | 50 | 50 | 50 | 50 |

The wet strength of paper treated with the resin of Example 1 was further determined in the following manner:

A 100% bleached cotton stock was refined to 30° Shopper-Riegler and adjusted to a pH value of 7. To 100 parts by dry weight of the stock was added 1 part by dry weight of resin; sheets of paper were made on a Frank mold and dried for 5 minutes at 120° C. The tensile test results on the paper were as follows:

Dry: 1.765 kg./cm., viz an increment of 26% compared with the untreated paper;

Wet: 0.645 kg./cm., viz an increment of 270% compared with the untreated paper.

A further illustration of the value of the product of Example 1 is afforded by its contribution to pigment retention in the manufacture of paper.

An aqueous suspension of cellulose fibers containing 1% by weight of dry substance was adjusted to a pH value of 7±0.1 before adding 10% of titania (by the dry weight of fiber), with agitation, followed by 1, 0.5 and 0.1% respectively of the product of the reaction of Example 1 (these concentrations are expressed in parts per thousand of dry resin by weight of fiber). After agitating for 10 minutes, the fiber suspension was filtered through a fine-meshed cloth, recovering the pigment not retained by the fiber and determining the amount thereof gravimetrically.

| Sample: | Percentage of retained pigment, percent |
|---|---|
| Control | 22.5 |
| 0.1% | 65 |
| 0.5% | 91.5 |
| 1% | 91.5 |

What I claim is:

1. A process for the manufacture of a water-soluble cationic thermosetting resin comprising reacting a polyester resin having a terminal carboxylic group and which is the reaction product of one mole of a saturated or unsaturated dicarboxylic acid having 3–10 carbon atoms with 0.5–1.5 mols of a straight or branched chain aliphatic glycol with an epoxy-amine addition compound to form a reaction product, said epoxy-amine addition compound being the reaction preduct of a substance which contains a plurality of epoxy groups per molecule, and a polyalkylene polyamine of the formula

$$(H_2N\text{---}R\text{---}NH)_x\text{---}H$$

in which x is at least 1 and R is an ethylene, propylene or butylene radical, there being at least 5–12 reactive hydrogen atoms per epoxy group, the said polyester being reacted with the epoxy-amine addition compound in proportions such that there are 0.05–0.2 free carboxylic groups per reactive hydrogen atom and condensing the reaction product by addition of at least 0.5 mol of epichlorhydrin per reactive hydrogen atom.

2. A process as claimed in claim 1, wherein substances containing the epoxy groups are the diglycidic esters of aliphatic poly-alcohol, polyhydroxy-phenols or polyphenols.

3. A process as claimed in claim 1, wherein said polyester is reacted with the epoxy-amine addition compound at a temperature below 130° C.

4. A process as claimed in claim 3 wherein the reaction product is reacted with the epichlorhydrin, in an aqueous or water-alcohol solution.

5. A process as claimed in claim 4 wherein the product of the reaction in aqueous or water-alcohol solution with epichlorhydrin is treated with a reagent to quaternize the nitrogen atoms in order to improve the stability of the resin.

6. A water-soluble cationic thermosetting resin as manufactured by the process of claim 1.

7. A process as claimed in claim 1, wherein the epoxy group-containing substance is a bisphenol A-epichlorhydrin resin.

References Cited

UNITED STATES PATENTS

| | | | |
|---|---|---|---|
| 3,409,577 | 11/1968 | Wong | 260—835 |
| 3,449,281 | 6/1969 | Sullivan | 260—835 |
| 3,577,313 | 5/1971 | Bolger | 260—29.2 Ep |
| 3,027,341 | 3/1962 | Balding | 260—29.2 Ep |
| 3,218,273 | 11/1965 | Montesano | 260—29.2 Ep |
| 3,507,820 | 4/1970 | Maeda | 260—29.2 Ep |

FOREIGN PATENTS

| | | | |
|---|---|---|---|
| 789,070 | 7/1968 | Canada | 260—835 |

PAUL LIEBERMAN, Primary Examiner

U.S. Cl. X.R.

260—16, 17.4 BH, 17.4 CL, 29.2 Ep, 29.3, 29.4 R; 117—155